(12) United States Patent
Teng et al.

(10) Patent No.: US 8,040,104 B2
(45) Date of Patent: Oct. 18, 2011

(54) WORKSTATION

(75) Inventors: Ming-Chang Teng, Hsinchu (TW);
Yi-Zheng Wu, Taipei (TW); One-Der Long, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 841 days.

(21) Appl. No.: 12/111,941

(22) Filed: Apr. 29, 2008

(65) Prior Publication Data

US 2009/0169347 A1 Jul. 2, 2009

(30) Foreign Application Priority Data

Dec. 28, 2007 (TW) .............................. 96151044 A

(51) Int. Cl.
*H02J 7/00* (2006.01)

(52) U.S. Cl. ........ 320/113; 320/114; 320/109; 446/175; 29/705

(58) Field of Classification Search .......... 320/113–115, 320/109; 446/454, 431, 269; 414/401, 281–282; 29/705–712

See application file for complete search history.

(56) References Cited

U.S. PATENT DOCUMENTS

| | | | |
|---|---|---|---|
| 5,150,506 A * | 9/1992 | Kotake et al. | 29/407.05 |
| 5,239,931 A | 8/1993 | Muselli et al. | |
| 5,892,350 A * | 4/1999 | Yoshikawa | 320/107 |
| 6,591,721 B2 * | 7/2003 | Stratico et al. | 82/162 |
| 6,643,905 B2 * | 11/2003 | Rhoads et al. | 29/407.09 |
| 7,719,229 B2 * | 5/2010 | Kaneko et al. | 320/113 |
| 2007/0216347 A1 | 9/2007 | Kaneko et al. | |
| 2009/0169347 A1 * | 7/2009 | Teng et al. | 414/401 |

FOREIGN PATENT DOCUMENTS

| | | |
|---|---|---|
| EP | 1819026 | 8/2007 |
| TW | M267730 | 6/2005 |
| WO | 2004110806 | 12/2004 |

OTHER PUBLICATIONS

"Notice of Allowance of Taiwan counterpart application", issued on Aug. 25, 2009, p. 1-p. 3.

* cited by examiner

*Primary Examiner* — Minh Trinh
(74) *Attorney, Agent, or Firm* — Jianq Chyun IP Office

(57) ABSTRACT

A workstation including a workstation body, a horizontal omni-directional moving carrier, a sensor mechanism, a grabbing device, and a control unit is provided. The horizontal omni-directional moving carrier carries the workstation body. The sensor mechanism includes an oscillating bar and a plurality of electrodes. The oscillating bar pivoted on the workstation body leans against an autonomous mobile device when the device enters the workstation. The electrodes, disposed on the oscillating bar, electrically connect the autonomous mobile device when the oscillating bar leans against the autonomous mobile device. The grabbing device is disposed on the workstation body. The control unit is electrically connected to the electrodes and the grabbing device. When the oscillating bar leans against the autonomous mobile device, the control unit receives a signal from the electrodes and drives the grabbing device to grab the autonomous mobile device, such that the workstation body aligns with the autonomous mobile device.

15 Claims, 10 Drawing Sheets

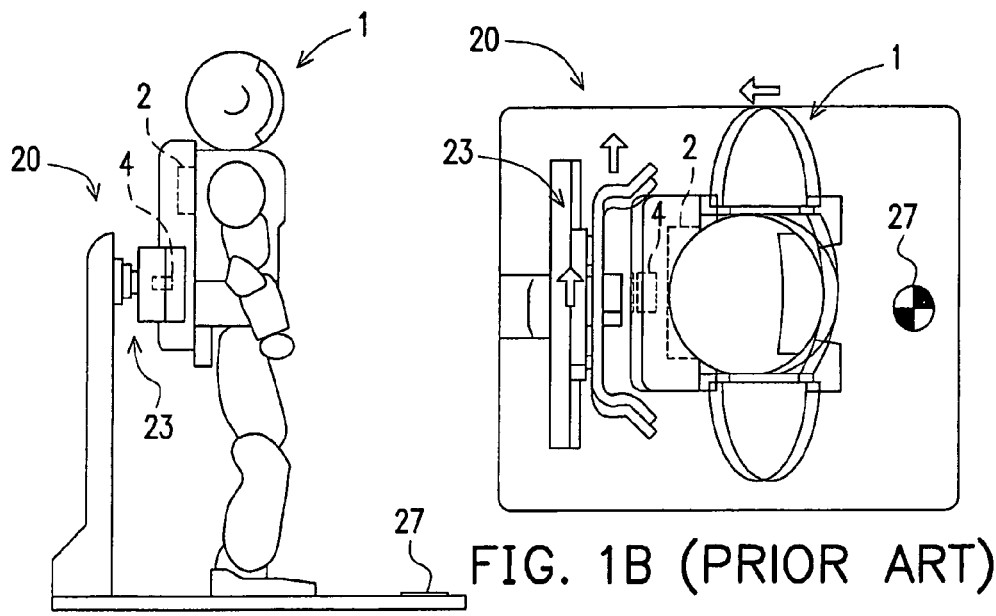
FIG. 1A (PRIOR ART)
FIG. 1B (PRIOR ART)
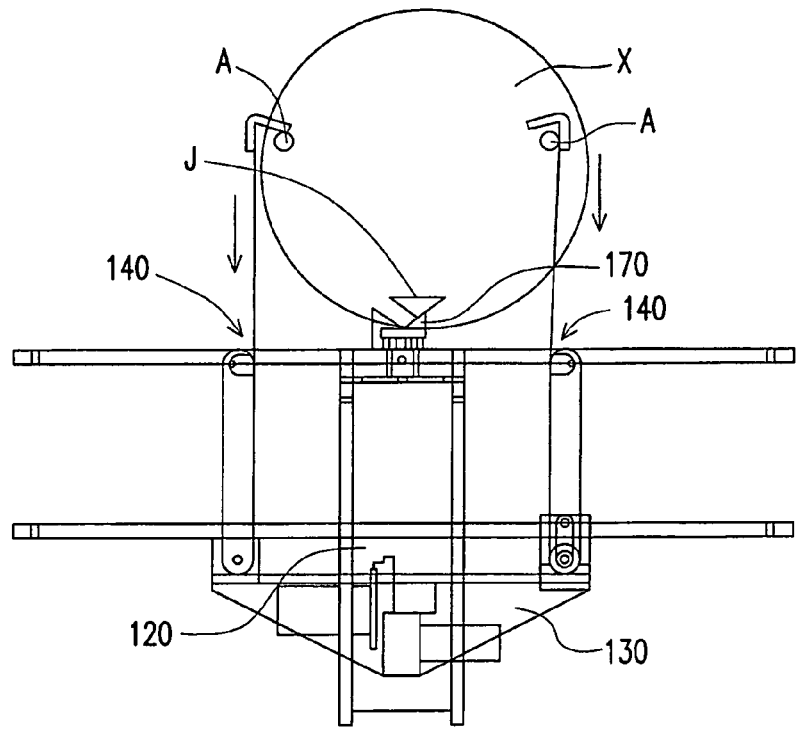
FIG. 2 (PRIOR ART)

WORKSTATION

CROSS-REFERENCE TO RELATED APPLICATION

This application claims the priority benefit of Taiwan application serial no. 96151044, filed on Dec. 28, 2007. The entirety the above-mentioned patent application is hereby incorporated by reference herein and made a part of specification.

BACKGROUND OF THE INVENTION

1. Field of the Invention

The present invention generally relates to a workstation suitable for being aligned with an autonomous mobile device.

2. Description of Related Art

Due to rapid progress in technology, the industry develops towards automatization, such that repeated, trivial, and toilful labour intensive work is carried out by automatic machines.

Autonomous mobile device is important for automatization. Equipped with different fittings, an autonomous mobile device is provided with special duties, and will be widely adopted. Therefore, in recent years, the development of the autonomous mobile device is increasingly highlighted. The operating time of the autonomous mobile device is mainly influenced by its power source-battery. The operating time of the autonomous mobile device is in direct proportion to the electric quantity of the battery, and the latter is further in direct proportion to volume and weight of the battery. Therefore, in order to last for a long time, the autonomous mobile device has to carry a heavy and large-sized battery, which will definitely increase the volume of the autonomous mobile device and require a greater output.

Currently, the common methods for solving the power problem and increasing the endurance of the autonomous mobile device may be generally divided into charging and battery replacement types. For example, the autonomous mobile device is charged by automatically entering a workstation. The autonomous mobile device is static in charging, and as a large electric quantity is needed, the autonomous mobile device has to be charged for a long time. However, autonomous mobile devices for duty purposes such as security patrol, plant examination, and workpiece installation, are not allowed to pause in work. In this situation, if a quick charge is performed according to requirements, the service life of the battery may be shortened.

For example, a battery charging method of a robot may be referred to in European Patent No. EP1819026 A2 "Charging System for Legged Mobile Robot". FIGS. 1A and 1B are schematic views of a robot charging system according to European Patent No. EP1819026 A2. Together referring to FIGS. 1A and 1B, a workstation 20 has a position mark 27, the two legs of a robot 1 can move autonomously, and the robot 1 is aligned with the workstation 20 through a visual sensor. After entering the workstation 20, the robot 1 turns around to have an electrode device 4 connected to the workstation 20 and thus a battery 2 thereof is charged. A support device 23, installed on the workstation 20, has a slope opening, and may slide from left to right, so as to correct errors caused by the entry of the robot 1 into the workstation 20. After it is confirmed that the robot 1 correctly matches the workstation 20, the workstation 20 begins to charge the robot 1. If the robot 1 receives a task request before the charging is finished, it is first determined whether the task can be finished according to the workload and the remaining electric quantity of the robot 1. In this manner, if the determination result is negative, the robot 1 is continuously charged, and if the determination result is positive, the robot 1 immediately carries out the task.

Although the battery replacement type solves the stagnation problem of the autonomous mobile device, when the battery is replaced, the alignment between the autonomous mobile device and the workstation is quite important. If the deviation amount between the autonomous mobile device and the battery replacement device is too large, the battery may not be replaced successfully. If the autonomous mobile device is compulsively positioned by an external force, the autonomous mobile device or the workstation may be damaged.

For example, a battery replacement manner of a robot may be referred to in International Patent No. WO 2004/110806 A1 "Battery Replacement Device". Referring to FIG. 2, the robot X is positioned with a bilaterally symmetrical drawing arm 140, in which the drawing arm 140 extends to hook a restraining portion A respectively on two sides of the robot X, and then a drawing portion 130 is used to draw the robot X toward a device body 120. As a positioning portion J matches a base portion 170 in cones, when the robot X is drawn into the device body 120, the device body 120 slides left or rightward along a slide rail for positioning till the positioning portion J completely matches the base portion 170, thereby achieving the purpose of precise positioning. The above manner for positioning the robot X is to draw the robot X by a drawing arm. However, if the robot X weighs too much, or the robot X has a braking device, it is impossible to position the robot X. In addition, if the entering angle of the robot X has a large deviation after reaching the battery replacement position, it is difficult for the extending drawing arm 140 to hook the robot X at the same time, and thus it is impossible to position the robot X.

In addition, for example, another autonomous mobile device may be referred to in U.S. Pat. No. 5,239,931 "Automotive Truck with Robot and Automatic Batteries Replacement System". In this patent, a battery replacement mechanism of an automatic guided vehicle (AGV) is introduced. When short of power, the AGV has to enter a workstation to have its battery replaced. As shown in FIG. 3, it is assumed that the workstation R1 on the left side is used for installing a charged battery. After the AGV enters the workstation, the battery with insufficient power in the AGV and the battery finishing charging in the workstation together move rightward through a motor, a slide rail, and a slide screw of the workstation, such that the battery finishing charging is installed on the AGV, and the battery with insufficient power will enter a workstation R2 on the right side for charging till the AGV enters the workstation for the next time. Seen from FIG. 3, as the route of the AGV is fixed, though the AGV can be precisely aligned with the workstation through a positioning groove, the AGV may only travel along a planned route, and thus the moving function of the AGV is greatly limited.

SUMMARY OF THE INVENTION

Accordingly, the present invention is directed to a workstation capable of being aligned with and connected to an autonomous mobile device. Moreover, even if the autonomous mobile device deviates from the angle and position for entering the workstation, the autonomous mobile device may still be successfully aligned with the workstation.

A workstation suitable for being aligned with an autonomous mobile device is provided. The workstation includes a workstation body, a horizontal omni-directional moving carrier, a sensor mechanism, a grabbing device, and a control unit. The horizontal omni-directional moving carrier carries the workstation body. The sensor mechanism includes an oscillating bar and a plurality of electrodes. The oscillating bar, pivoted on the workstation body, leans against the autonomous mobile device when the autonomous mobile device enters the workstation. The electrodes, disposed on the oscillating bar, are electrically connected to the autonomous mobile device when the oscillating bar leans against the autonomous mobile device. The grabbing device is disposed on the workstation body. The control unit is electrically connected to the electrodes and the grabbing device. When the oscillating bar leans the autonomous mobile device, the control unit receives a sensing signal sent from the electrodes and correspondingly drives the grabbing device to grab the autonomous mobile device, such that the workstation body is aligned with the autonomous mobile device.

In the workstation of the present invention, the workstation body can move relative to the autonomous mobile device so as to be aligned with and connected to the same through the rotatable sensor mechanism, horizontal omni-directional moving carrier, and grabbing device. Therefore, according to the present invention, the angle and position of the autonomous mobile device to enter the workstation are in a wider range than the conventional art.

In order to make the aforementioned and other objectives, features, and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 1A and 1B are schematic views of a robot charging system according to European Patent No. EP 1819026 A2.

FIG. 2 is a schematic view of a robot and a battery replacement device according to WO 2004/110806 A1.

DESCRIPTION OF THE EMBODIMENTS

Figure 3:
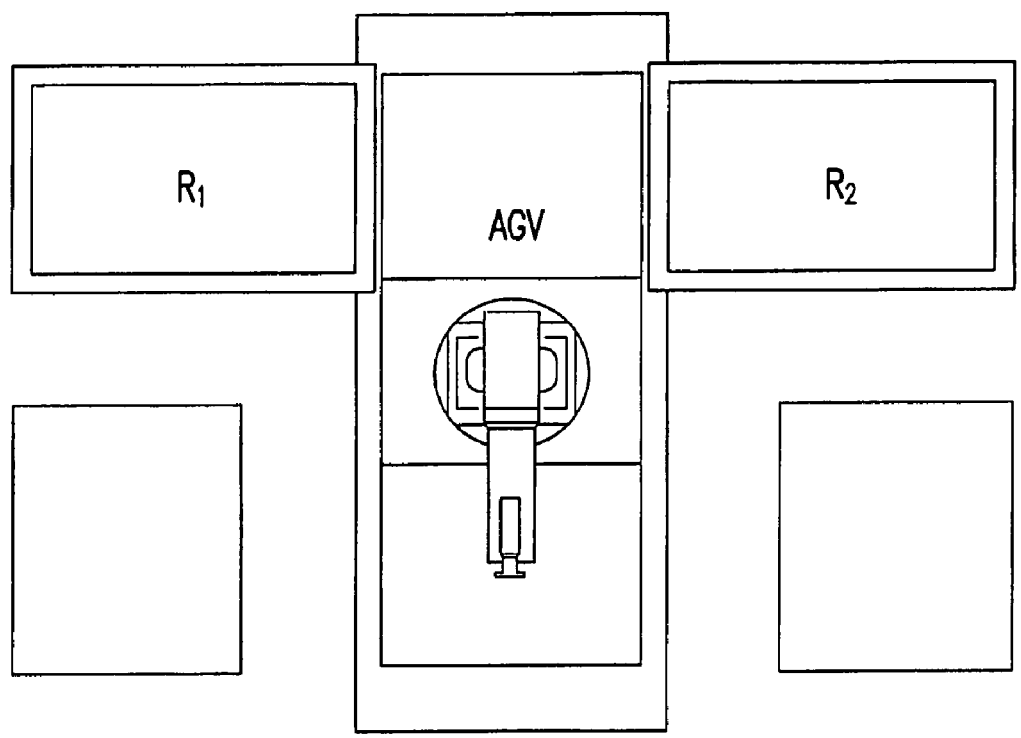
FIG. 3 is a schematic view of a battery replacement mechanism of an AGV according to U.S. Pat. No. 5,239,931.

Reference will now be made in detail to the present embodiments of the invention, examples of which are illustrated in the accompanying drawings. Wherever possible, the same reference numbers are used in the drawings and the description to refer to the same or like parts.

Figure 4:
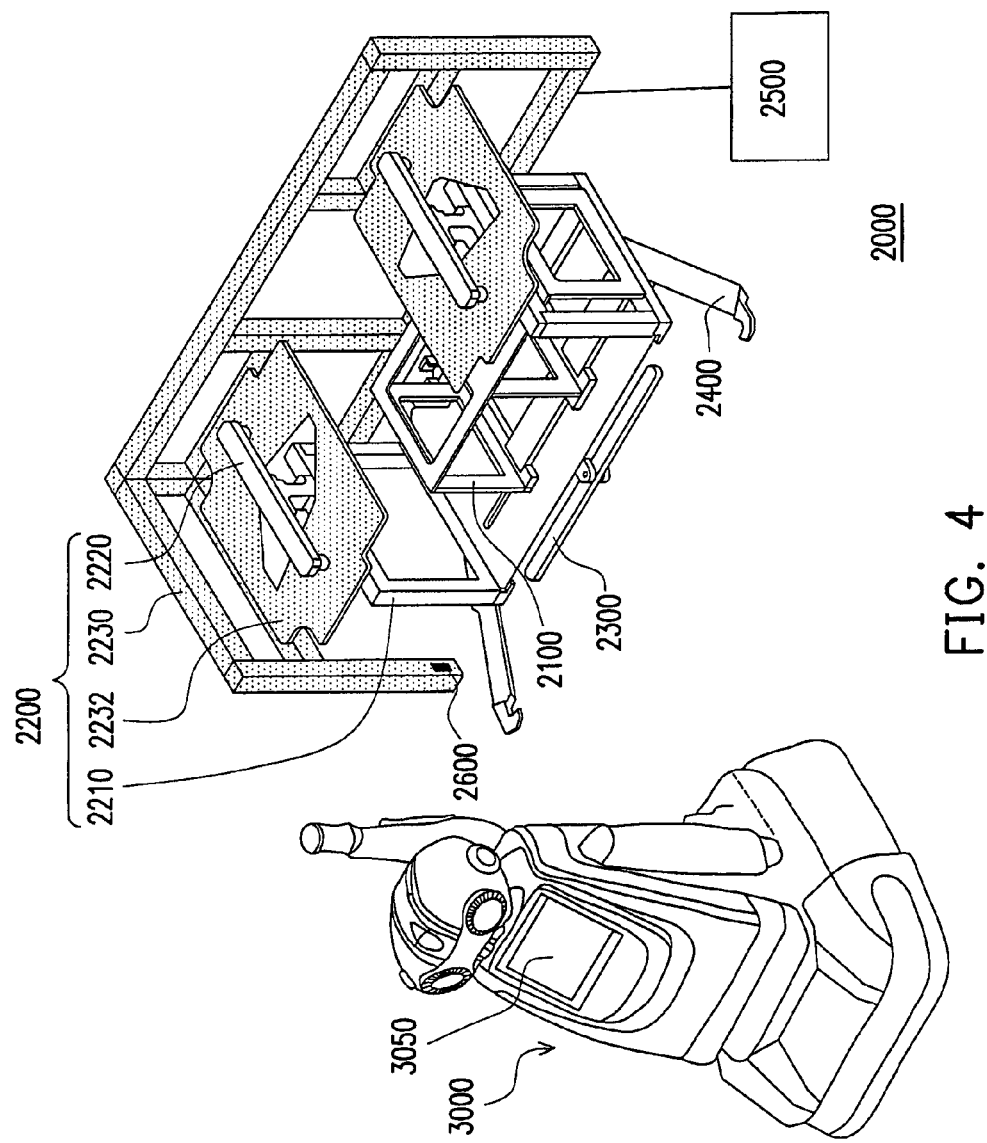
FIG. 4 is a schematic view of an autonomous mobile device entering a workstation according to an embodiment of the present invention.

FIG. 4 is a schematic view of an autonomous mobile device entering a workstation according to an embodiment of the present invention. Referring to FIG. 4, the workstation 2000 is suitable for being aligned with an autonomous mobile device 3000, such that the autonomous mobile device 3000 is able to charge or replace batteries in the workstation 2000, convey goods to the workstation 2000 or unload goods from the workstation 2000, and so on. The autonomous mobile device 3000 of this embodiment is, for example, an autonomous mobile robot used for various purposes such as security patrol, plant examination, and workpiece installation. In other embodiments, the autonomous mobile device 3000 may also be an AGV that moves autonomously.

Figure 5:
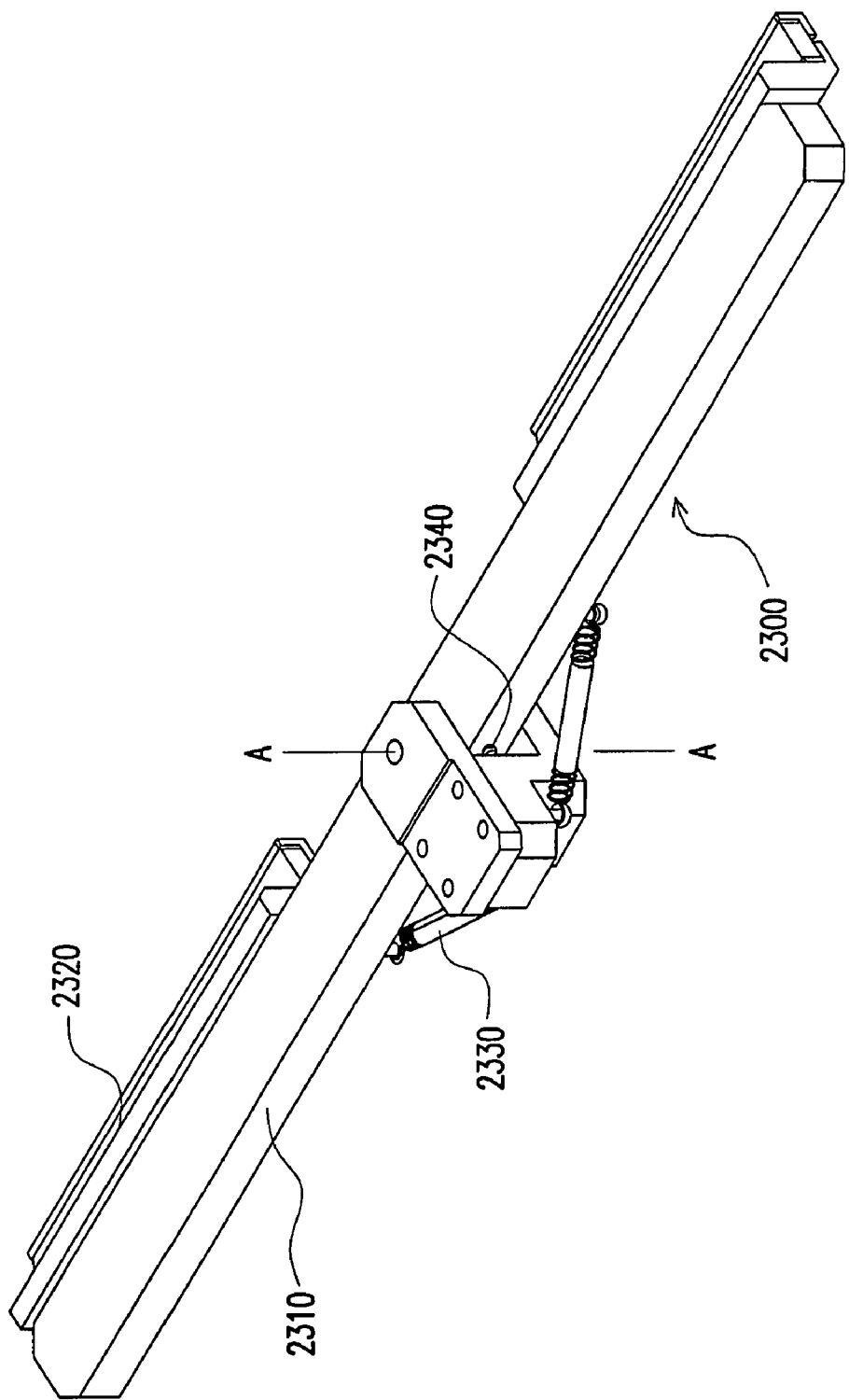
FIG. 5 is a schematic view of a sensor mechanism in FIG. 4.

FIG. 5 is a schematic view of a sensor mechanism in FIG. 4. Together referring to FIGS. 4 and 5, the workstation 2000 includes a workstation body 2100, a horizontal omni-directional moving carrier 2200, a sensor mechanism 2300, a grabbing device 2400, and a control unit 2500. The horizontal omni-directional moving carrier 2200 may carry the workstation body 2100 of various working types. As shown in FIG. 5, the sensor mechanism 2300 includes an oscillating bar 2310 and a plurality of electrodes 2320. The oscillating bar 2310, pivoted on the workstation body 2100, leans against the autonomous mobile device 3000 when the autonomous mobile device 3000 enters the workstation 2000. The electrodes 2320, disposed on the oscillating bar 2310, are electrically connected to the autonomous mobile device 3000 when the oscillating bar 2310 leans against the autonomous mobile device 3000. The grabbing device 2400 is disposed on the workstation body 2100. The control unit 2500 is electrically connected to the electrodes 2320 and the grabbing device 2400. When the oscillating bar 2310 leans against the autonomous mobile device 3000, the control unit 2500 receives a signal triggered by the electrodes 2320 and correspondingly drives the grabbing device 2400 to grab the autonomous mobile device 3000, such that the workstation body 2100 is aligned with the autonomous mobile device 3000.

In particular, the horizontal omni-directional moving carrier 2200 includes a carrying frame 2210, a sliding frame 2220, and a fixing frame 2230. The carrying frame 2210 and the sliding frame 2220 are both disposed in the fixing frame 2230, and are connected with each other, in which the carrying frame 2210 is used for carrying the workstation body 2100. The fixing frame 2230 has a support sliding surface 2232, and the sliding frame 2220 passes through the support sliding surface 2232 and is suspended thereon. In addition, the sliding frame 2220 located on the support sliding surface 2232 is slidably disposed on the support sliding surface 2232 via pulleys, balls, or other rolling members.

Further, although the horizontal omni-directional moving carrier 2200 of this embodiment achieves the horizontal omni-directional moving effect by means of suspension, those of ordinary skill in the art may also achieve the effect of making the horizontal omni-directional moving carrier 2200 omni-directionally move by other manners. For example, the above purpose can be fulfilled by disposing a plurality of movable pulleys on the bottom of the carrying frame 2210, or by conventional manners such as air pressure, magnetic force, or liquid buoyant force.

Referring to FIGS. 4 and 5, in this embodiment, the oscillating bar 2310 is a long narrow strip, and the electrodes 2320 are respectively disposed on two ends of the oscillating bar 2310. The oscillating bar 2310 is pivoted on a front end of the workstation body 2100, and is suitable for rotating about a rotation axis A, so as to be aligned with and connected to the entering autonomous mobile device 3000. The front end of the workstation body 2100 refers to a side of the workstation body 2100 nearer to the autonomous mobile device 3000 when the autonomous mobile device 3000 enters the workstation 2000.

In particular, electrode units 3200 for being electrically connected to the electrodes 2320 are correspondingly disposed on the autonomous mobile device 3000. When the autonomous mobile device 3000 is aligned with the workstation 2000, the control unit 2500 receives a signal triggered by the electrodes 2320 and the electrode units 3200, and thus actuates the grabbing device 2400. The autonomous mobile device 3000 will be cut of if its battery is replaced, and the system thereof must be restarted after the replacement, so the whole operation process is very complicated. Therefore, to solve the above problem, the electrodes 2320 are power output terminals. As such, when electrically connected to the electrode units 3200, the electrodes 2320 output power to the autonomous mobile device 3000 through the electrode units 3200, thus preventing the autonomous mobile device 3000 from being powered off during the battery replacement.

Moreover, the sensor mechanism 2300 further includes a plurality of first elastic members 2330 connected between the oscillating bar 2310 and the workstation body 2100. In this embodiment, the first elastic members 2330 are springs, and respectively disposed on two sides of the pivot of the oscillating bar 2310. By the elastic force of the two first elastic members 2330, the oscillating bar 2310 is restored to its original position when not leaning against the autonomous mobile device 3000.

In addition, the sensor mechanism 2300 further includes a plurality of limiting members 2340 disposed on the oscillating bar 2310, for limiting the rotation angle of the oscillating bar 2310. The limiting members 2340 of this embodiment are screws. However, those of ordinary skill in the art should understand that other structures, such as pads and cams, may also be adopted to achieve the purpose of limiting the rotation angle of the oscillating bar 2310.

Figure 6:
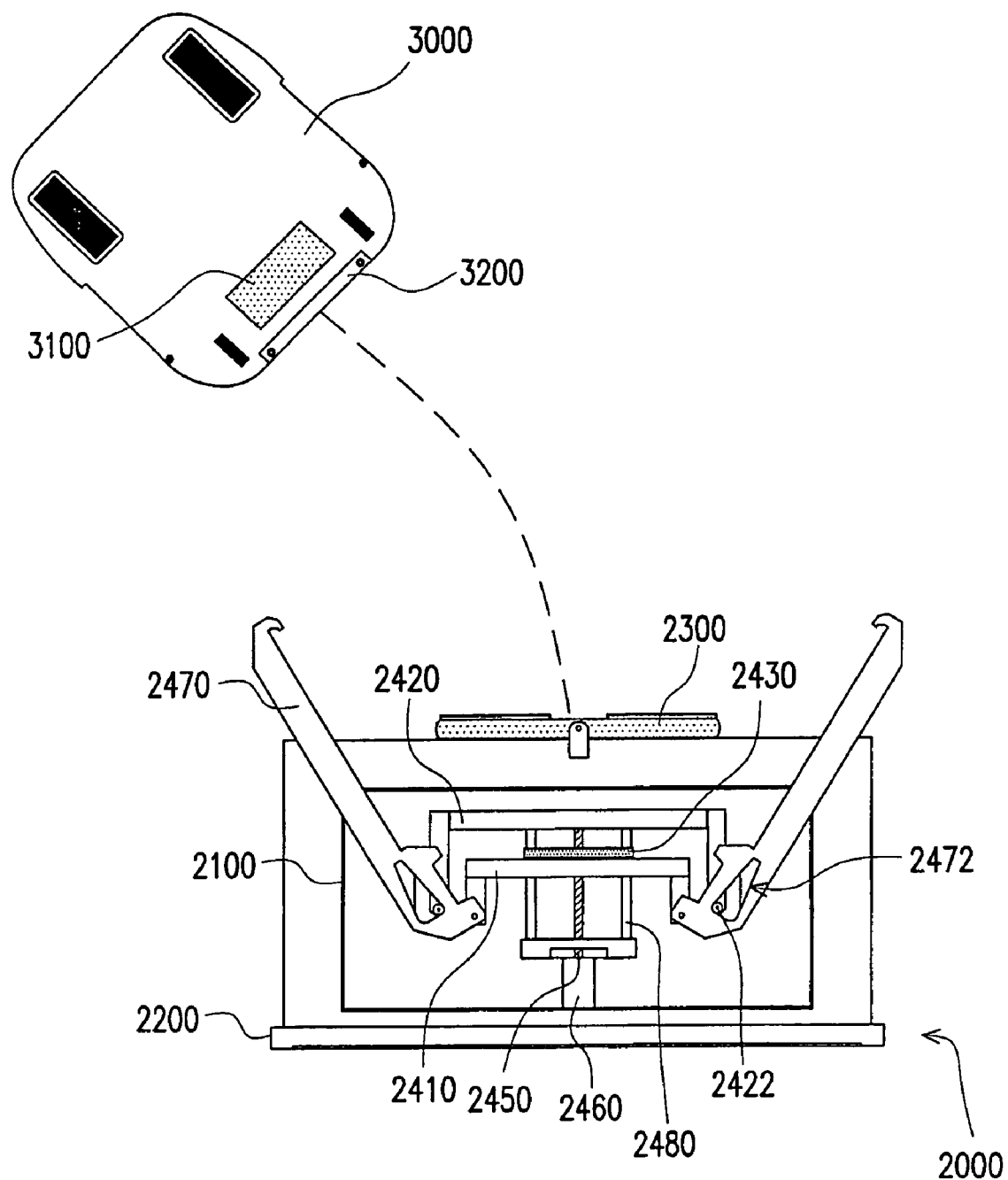
FIG. 6 is a bottom view of the autonomous mobile device in FIG. 4 entering into the workstation.
Figure 7:
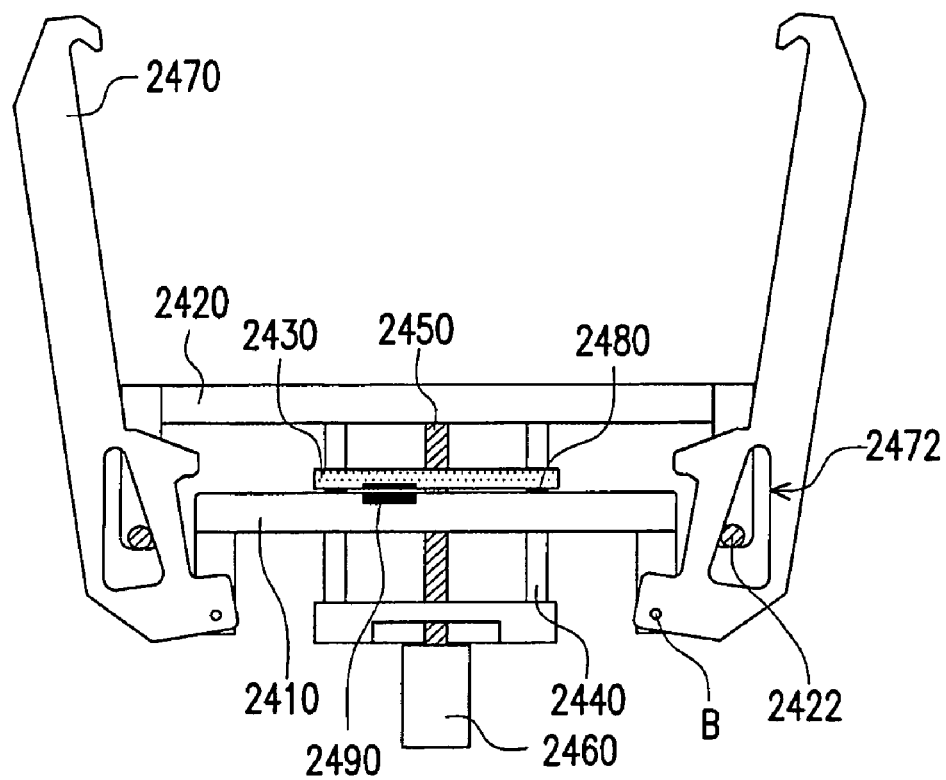
FIG. 7 is a top view of the grabbing device.

FIG. 6 is a bottom view of the autonomous mobile device in FIG. 4 entering the workstation. Referring to FIG. 6, similarly, the grabbing device 2400 disposed on the workstation body 2100 is used for grabbing the autonomous mobile device 3000 that enters the workstation 2000, such that the autonomous mobile device 3000 is accurately aligned with the workstation 2000 to perform an assigned task. FIG. 7 is a schematic view of the grabbing device. Referring to FIG. 7, the grabbing device 2400 further includes a first support frame 2410, a second support frame 2420, a slave block 2430, a plurality of sliding shafts 2440, a slide screw 2450, a driver 2460, a plurality of grabbing arms 2470 featured in having jaws, and a grabbing arm restoring member (not shown). The slave block 2430 is disposed between the first support frame 2410 and the second support frame 2420. One end of each sliding shaft 2440 is connected to the second support frame 2420, and each sliding shaft 2440 passes through the first support frame 2410 and the slave block 2430, such that the first support frame 2410 and the slave block 2430 may slide on the sliding shafts 2440. One end of the slide screw 2450 is connected to the second support frame 2420, and the slide screw 2450 passes through the first support frame 2410 and the slave block 2430, such that the slide screw 2450 and the slave block 2430 are forced to move by each other.

Next, referring to FIG. 7, the driver 2460 is used for driving the slide screw 2450 to propel the slave block 2430 to move along the sliding shafts 2440. One end of each grabbing arm 2470 is pivoted on the first support frame 2410, and the other end thereof is free. In addition, each grabbing arm 2470 has a cam curved surface 2472, and the cam curved surface 2472 is adjacent to the pivot where the grabbing arm 2470 is pivoted to the first support frame 2410. The second support frame 2420 has a plurality of rollers 2422 respectively bearing and tracing the cam curved surface 2472 on the grabbing arms 2470. The grabbing arm restoring member provides an elastic prestress, such that the grabbing arms 2470 are kept away from each other by the elastic prestress in an initial circumstance.

Moreover, the grabbing device 2400 further includes a buffer member 2480 disposed between the first support frame 2410 and the slave block 2430, for buffering the contact between the slave block 2430 and the first support frame 2410, so as to prevent generating an over-high stress due to the contact of the two. The buffer member 2480 may be an elastic spring, plastic block, or any other conventional member used for buffering.

In addition, the grabbing device 2400 further includes a second sensor 2490. The second sensor 2490 is disposed between the first support frame 2410 and the slave block 2430, for sensing a relative position between the slave block 2430 and the first support frame 2410, so as to trigger a sensing signal to the control unit 2500 after the distance between the slave block 2430 and the first support frame 2410 reaches a preset value. As such, the control unit 2500 is enabled to control the workstation 2000 to perform a subsequent assigned task. In this embodiment, the second sensor 2490 may be an optical sensor, a mechanical sensor, or an ultrasonic sensor according to actual requirements.

Again referring to FIG. 4, in order to inform the workstation 2000 with the entry of the autonomous mobile device 3000 so as to start carrying out an assigned task, a first sensor 2600 is disposed on the autonomous mobile device 3000, the workstation body 2100, or the horizontal omni-directional moving carrier 2200, and the first sensor 2600 is electrically connected to the control unit 2500. The first sensor 2600 senses a relative position between the autonomous mobile device 3000 and the workstation 2000, so as to confirm whether the autonomous mobile device 3000 enters the workstation, and send a confirmation signal to the control unit 2500. In FIG. 4, the first sensor 2600 is disposed on the fixing frame 2230, and may be an optical sensor, a mechanical sensor, or an ultrasonic sensor. For example, as an optical sensor, the first sensor 2600 generates and sends a signal to the control unit 2500 when light is blocked due to the entry of the autonomous mobile device 3000 into the workstation. Or, in other embodiments, the first sensor 2600 may also be a signal emitter, and the control unit 2500 has a signal receiver. Thereby, when the autonomous mobile device 3000 intends to enter the workstation 2000, the signal emitter emits a signal to the signal receiver, and thus the control unit 2500 actuates the sensor mechanism 2300 and the grabbing device 2400.

The aligning process between the workstation 2000 and the autonomous mobile device 3000 of this embodiment will be described below with the accompanying drawings.

First, referring to FIGS. 4 and 6, the autonomous mobile device 3000 of this embodiment has a logic operation unit 3050 and a replaceable battery 3100. The logic operation unit 3050 is used for controlling the autonomous mobile device 3000 to perform tasks and detect the electric quantity of the battery 3100. When it is detected by the logic operation unit 3050 that the electric quantity of the battery 3100 is too low and the battery should be replaced, the logic operation unit 3050 controls the autonomous mobile device 3000 to enter the workstation 2000 and replace the battery.

Figure 8:
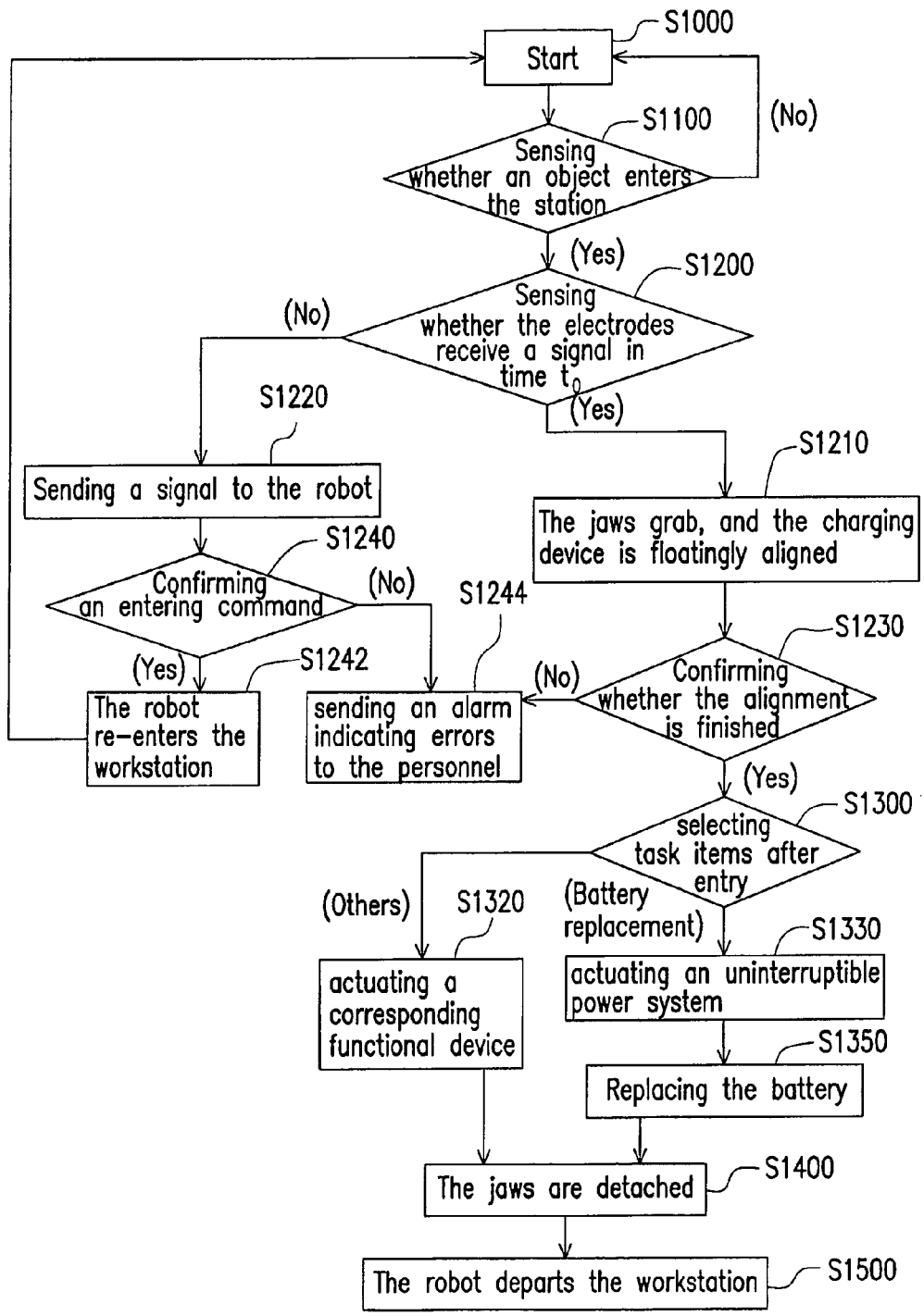
FIG. 8 is a flow chart of the aligning process between the autonomous mobile device and the workstation according to this embodiment.

FIG. 8 is a flow chart of the aligning process between the autonomous mobile device and the workstation according to this embodiment. First, as in Step S1000, the power supplies of the workstation 2000 and the autonomous mobile device 3000 are turned on, and the autonomous mobile device 3000 may perform an assigned task, such as conveying, repair, disassembly/assembly, or patrol.

Next, together referring to FIGS. 4 and 8, in Step S1100, the first sensor 2600 senses whether any object enters the workstation. Without sensing any object entering the workstation 2000, the first sensor 2600 will sense continuously. While on sensing that an object enters the workstation 2000, the first sensor 2600 feeds back a sensing signal to the control unit 2500.

Then, together referring to FIGS. 5 and 8, in Step S1200, after sensing that an object enters the workstation 2000, in a preset time to, the first sensor 2600 generates a signal due to the electrical connection between the electrodes 2320 on the oscillating bar 2310 and the object, and sends the signal to the control unit 2500 for determining whether the oscillating bar 2310 leans and is connected to the autonomous mobile device 3000.

If not, it is possible that the relative distance between the autonomous mobile device 3000 and the workstation 2000 is too long, or the entering angle of the autonomous mobile device 3000 is too large, such that the oscillating bar 2310 cannot truly bear the autonomous mobile device 3000, and the electrodes 2320 may not be electrically connected to the autonomous mobile device 3000. Therefore, in Step S1220, the control unit 2500 sends a signal to the autonomous mobile device 3000. Next, in Step S1240, the autonomous mobile device 3000 confirms an entering command. Afterward, in Step S1242, the autonomous mobile device 3000 readjusts the angle to enter the workstation 2000. In addition, if the control unit 2500 confirms that the autonomous mobile device 3000 does not feed back a signal of entering the workstation 2000, the control unit 2500 informs personnel on site for examination with an alarm indicating errors.

Referring to FIGS. 5, 6 and 8, after the electrodes 2320 are electrically connected to the electrode units 3200, a signal is generated and transmitted to the control unit 2500. At this time, in Step S1210, the control unit 2500 controls the grabbing device 2400 to grab the autonomous mobile device 3000, and the workstation body 2100 is floatingly aligned with the autonomous mobile device 3000 by the horizontal omni-directional moving carrier 2200.

Figure 9A:
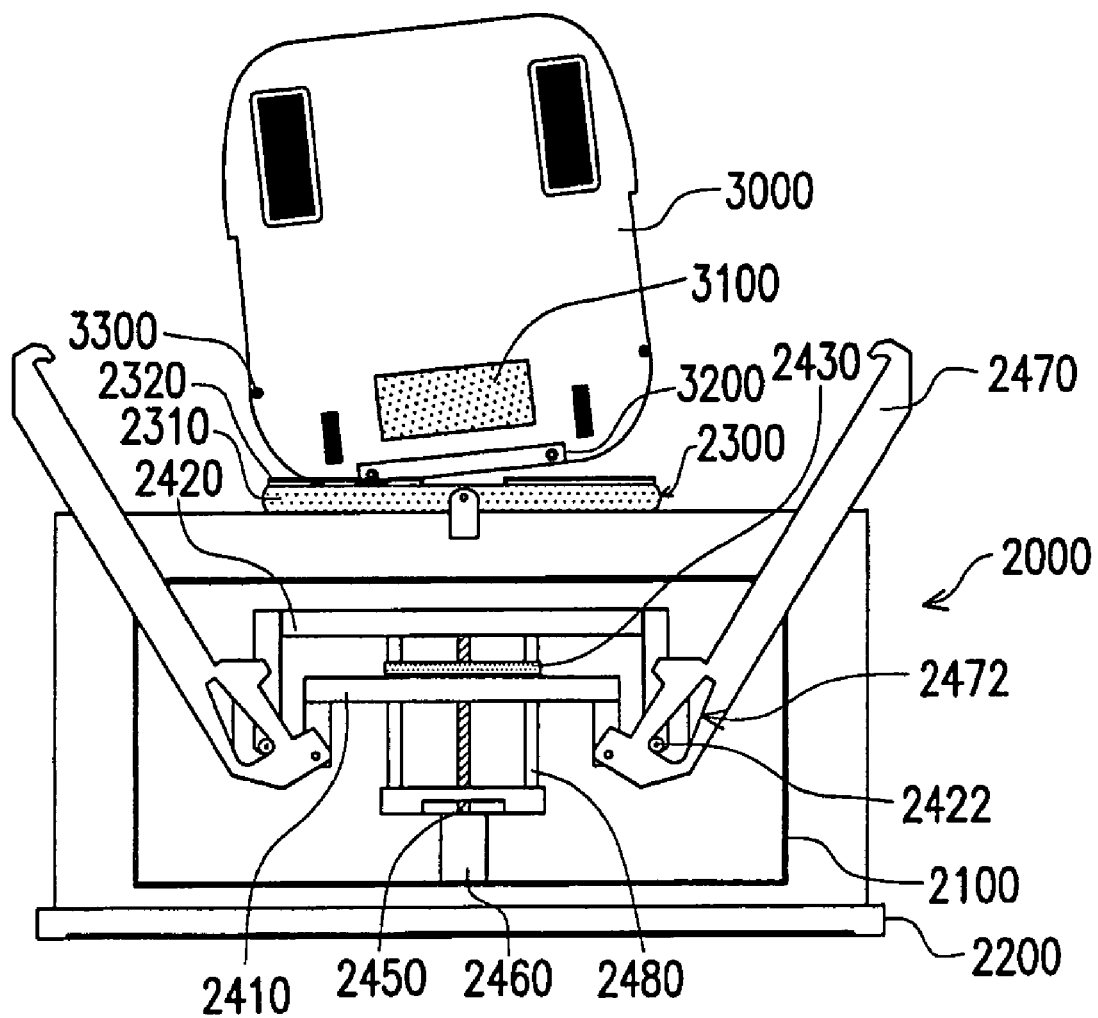
FIGS. 9A to 9C are flow charts of the aligning steps between the autonomous mobile device and the workstation in sequence.
Figure 9B:
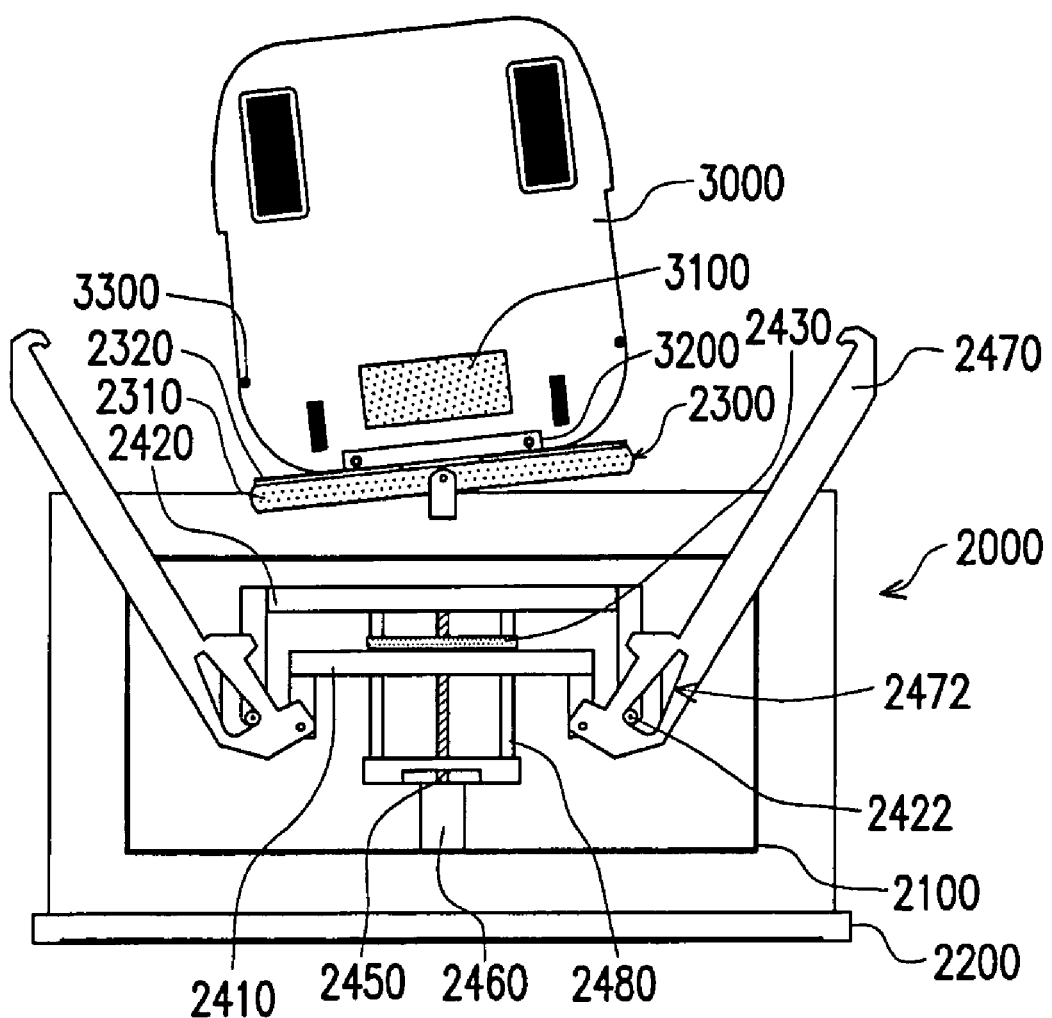
Figure 9C:
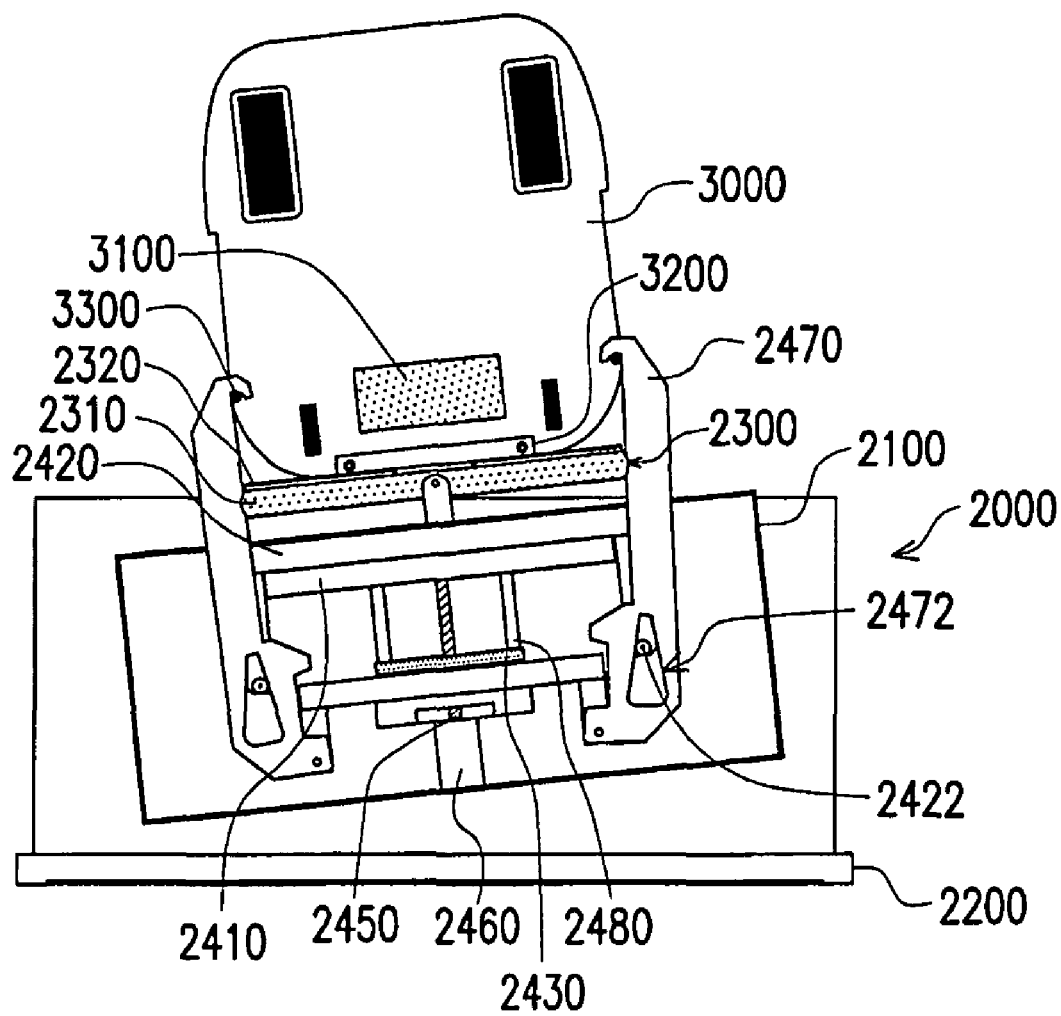

FIGS. 9A to 9C are flow charts of the aligning steps between the autonomous mobile device and the workstation in sequence. First, referring to FIG. 9A, in detail, when the autonomous mobile device 3000 enters the workstation 2000 and leans against the oscillating bar 2310 of the sensor mechanism 2300, as it is unable to predict the position and angle of the autonomous mobile device 3000 to enter the workstation 2000, the sensor mechanism 2400 may not be directly aligned with and electrically connected to the electrode units 3200 of the autonomous mobile device 3000 at the first instance.

Afterward, referring to FIGS. 4, 5, and 9B, the control unit 2500 controls the oscillating bar 2310 to rotate about the rotation axis A, such that the electrodes 2320 disposed on the oscillating bar 2310 are aligned with and electrically connected to the electrode units 3200 of the autonomous mobile device 3000, and a signal is triggered and transmitted to the controller unit 2500 after the electrical connection.

Next, together referring to FIGS. 4, 7, and 9C, on receiving the signal, the control unit 2500 controls the driver 2460 to propel the slide screw 2450 to rotate, so as to force the slave block 2430 to move along the sliding shafts 2440 toward the driver 2460. Thereby, the slave block 2430 is drawn close to the first support frame 2410, such that the first support frame 2410 also moves linearly toward the driver 2460. As one end of each grabbing arm 2470 is pivoted on the first support frame 2410, the grabbing arms 2470 may gradually balance the elastic prestress, and rotate about a pivot B. Meanwhile, the cam curved surface 2472 of the grabbing arms 2470 match the rollers 2422 on the second support frame 2420, such that the free end of each grabbing arm 2470 rotates about the pivot on the first support frame 2410, and hooks the autonomous mobile device 3000.

It should be noted that, in order to make the grabbing arms 2470 successively grab the autonomous mobile device 3000, structures or members for being hooked or dragged by the grabbing arms 2470 may be disposed on the autonomous mobile device 3000. In this embodiment, pins 3300 are installed on the bottom of the autonomous mobile device 3000. Thereby, when at least one grabbing arm 2740 hooks the pin 3300, the grabbing arm 2470 can stably grab the pin 3300.

Particularly, when the grabbing arm 2470 grabs the autonomous mobile device 3000, in order to prevent the failure of self-locking motor and breaking device caused by the forced movement with the autonomous mobile device 3000, when the autonomous mobile device 3000 is aligned with the workstation 2000, the autonomous mobile device 3000 does not move. Instead, the workstation body 2100 rotates and moves so as to be aligned with the autonomous mobile device 3000 through the omni-directional movement of the horizontal omni-directional moving carrier 2200.

Next, referring to FIGS. 4 and 8, in Step S1230, it is confirmed whether the autonomous mobile device 3000 is aligned with the workstation 2000.

Together referring to FIGS. 5 and 8, if an object other than the autonomous mobile device 3000 intrudes into the workstation 2000, no corresponding electrode units will be electrically connected to the electrodes 2320, so the control unit 2500 may send a signal to inform the system to generate a sound indicating errors, and thus personnel on site will come for examination, as shown in Step S1244.

Referring to FIG. 8, when it is confirmed that the autonomous mobile device 3000 is aligned with the workstation 2000, as shown in Step S1300, task items of the autonomous mobile device 3000 after entry are selected. The task items of the autonomous mobile device 3000 are, for example, article conveying, shape changing, on-site charging, and function variation or expansion.

If a task item is, for example, article conveying, shape changing, or function variation or expansion, as shown in Step S1320, a corresponding functional device of the workstation 2000 is actuated.

If a task item is to replace the battery of the autonomous mobile device 3000, as in Step S1330, an uninterruptible power system of the workstation 2000 is actuated. In particular, referring to FIGS. 5 and 9B, the uninterruptible power system makes the electrodes 2320 output power to the autonomous mobile device 3000 through the electrode units 3200, such that data damage or loss may not be caused by the power-off of the autonomous mobile device 3000 when the battery 3100 of the autonomous mobile device 3000 is replaced in the workstation 2000. Further, electronic parts in the autonomous mobile device 3000 may be prevented from being damaged by the surge of the current, thereby prolonging the service life of the autonomous mobile device 3000.

In addition, through the electrical conduction between the electrodes 2320 and the electrode units 3200, the data of the autonomous mobile device 3000 is transmitted to the workstation 2000.

The battery of the autonomous mobile device 3000 is replaced under the circumstance that the autonomous mobile device 3000 is uninterruptedly powered (Step S1350).

Further referring to FIGS. 7, 8, and 9C, after the battery replacement, in Step S1400, the grabbing arms 2470 of the grabbing device 2400 are detached from the autonomous mobile device 3000. The slide screw 2450 is driven by the driver 2460 to reversely rotate, so as to make the slave block 2430 move along the axial direction of the slide screw 2450 away from the driver 2460. The grabbing arm restoring member is increasingly restored with the movement of the slave block 2430 and the first support frame 2410, so the two grabbing arms 2470 are drawn away from each other to release the autonomous mobile device 3000. Afterward, the workstation body 2100 is restored to its original position.

Finally, in Step S1500, the autonomous mobile device 3000 leaves the workstation 2000.

In view of the above, according to the present invention, the workstation body of the workstation is floatingly disposed to get close to the autonomous mobile device, so the angle and position of the autonomous mobile device to enter the workstation are in a larger range of tolerable deviation. Moreover, after entering the workstation, the autonomous mobile device may be charged and the battery thereof may be replaced, so as to increase the operating time and enhance the working efficiency of the autonomous mobile device. Further, due to the electrical conduction between the sensing conductors on the sensor mechanism and the electrode units of the autonomous mobile device, data damaged or loss may not be caused by the power-off of the autonomous mobile device, and meanwhile, the parts inside the autonomous mobile device are prevented from being damaged by the surge of the current, thereby prolonging the service life of the autonomous mobile device. In addition, through the electrical conduction between the sensing conductors on the sensor mechanism and the electrode units of the autonomous mobile device, data of the autonomous mobile device can be transmitted to the workstation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A workstation, suitable for being aligned with an autonomous mobile device, comprising:
   a workstation body;
   a horizontal omni-directional moving carrier, for carrying the workstation body;
   a sensor mechanism, comprising:
      an oscillating bar, pivoted on the workstation body, for leaning the autonomous mobile device by spinning when the autonomous mobile device enters the workstation; and
      a plurality of electrodes, disposed on the oscillating bar, for being electrically connected to the autonomous mobile device when the oscillating bar leans against the autonomous mobile device;
   a grabbing device, disposed on the workstation body; and
   a control unit, electrically connected to the electrodes and the grabbing device, wherein when the oscillating bar leans against the autonomous mobile device, the control unit receives a sensing signal sent from the electrodes and correspondingly drives the grabbing device to grab the autonomous mobile device, such that the workstation body is aligned with the autonomous mobile device.

2. The workstation according to claim 1, wherein the horizontal omni-directional moving carrier comprises:
   a fixing frame, provided with a support sliding surface;
   a sliding frame, suspended on the support sliding surface; and
   a carrying frame, connected to the sliding frame, for carrying the workstation body.

3. The workstation according to claim 1, further comprising a first sensor, disposed on the workstation body, the horizontal omni-directional moving carrier, or the autonomous mobile device, for sensing a relative position between the autonomous mobile device and the workstation.

4. The workstation according to claim 3, wherein the first sensor is an optical sensor, a mechanical sensor, or an ultrasonic sensor.

5. The workstation according to claim 1, wherein the sensor mechanism further comprises a first elastic member, connected between the oscillating bar and the workstation body.

6. The workstation according to claim 5, wherein the first elastic member is a spring.

7. The workstation according to claim 1, wherein the oscillating bar is striped, and the electrodes are respectively disposed on two ends of the oscillating bar.

8. The workstation according to claim 1, wherein the sensor mechanism further comprises a limiting member, disposed on the oscillating bar, for limiting a rotation angle of the oscillating bar.

9. The workstation according to claim 8, wherein the limiting member is a screw.

10. The workstation according to claim 1, wherein the grabbing device comprises:
   a first support frame;
   a second support frame;
   a slave block, disposed between the first support frame and the second support frame;
   a plurality of sliding shafts, wherein one end of each sliding shaft is connected to the second support frame, and each sliding shaft passes through the first support frame and the slave block, so as to enable the first support frame and the slave block to slide on the sliding shafts;
   a slide screw, wherein one end of the slide screw is connected to the second support frame, and the slide screw passes through the first support frame and the slave block, such that the slide screw and the slave block are forced to move by each other;
   a driver, for driving the slide screw, so as to propel the slave block to move along the sliding shafts;
   a plurality of grabbing arms, wherein one end of each grabbing arm is pivoted on the first support frame, each grabbing arm is further provided with a cam curved surface, and a plurality of rollers is disposed on the second support frame for bearing the cam curved surfaces of the grabbing arms respectively; and
   a plurality of grabbing arm restoring members, for providing an elastic prestress, such that the grabbing arms are kept away from each other by the elastic prestress in an initial circumstance,
   wherein when the driver drives the slide screw to propel the slave block to move along the sliding shafts, the slave block forces the first support frame to move along the sliding shafts, so as to increasingly balance the elastic prestress, and at this time, the grabbing arms rotate relative to the first support frame and are forced to move by the second support frame, so as to grab the autonomous mobile device.

11. The workstation according to claim 10, wherein the grabbing device further comprises a buffer member, disposed between the first support frame and the slave block.

12. The workstation according to claim 11, wherein the buffer member is a spring.

13. The workstation according to claim 10, wherein the grabbing device further comprises a second sensor, disposed between the first support frame and the slave block, for sensing a relative position between the first support frame and the slave block.

14. The workstation according to claim 13, wherein the second sensor is an optical sensor, a mechanical sensor, or an ultrasonic sensor.

15. The workstation according to claim 1, wherein the electrodes of the sensor mechanism are power output terminals, for outputting power to the autonomous mobile device when electrically connected to the autonomous mobile device.

* * * * *